United States Patent Office 3,112,328
Patented Nov. 26, 1963

3,112,328
3-DESOXY-Δ⁴-19-NOR-ANDROSTENES
Stefan Antoni Szpilfogel, Johannes Andreas Hanegraaf, and Leendert Antonius van Dijck, all of Oss, Netherlands, assignors to Organon Inc., Orange, N.J., a corporation of New Jersey
No Drawing. Filed Apr. 23, 1957, Ser. No. 654,454
Claims priority, application Netherlands Aug. 24, 1956
1 Claim. (Cl. 260—397.3)

The invention relates to new biologically active 19-norsteroid compounds which have a non-oxygenated C-atom 3 and to the preparation thereof.

It is known that aromatic hydrocarbons can be reduced to the corresponding cyclohexenes by treatment with an alkali metal dissolved in an amine with a low molecular weight (see J. Am. Chem. Soc. 76, 631 (1954)).

In addition it is known that an aromatic compound, which has an etherified hydroxyl group as a substituent, e.g. anisol, is converted, by treatment with an alkali metal dissolved in ethyl amine, into a mixture of compounds in which no splitting off of the oxygen containing substituent has taken place (see J. Am. Chem. Soc. 77, 6042 (1955)).

Now a process was found for the preparation of new biologically active 19-nor-steroids, characterized in that a steroid compound with an aromatic ring A, which in 3-position has an etherified hydroxyl group, in 17-position a free or functionally converted hydroxyl group and a hydrogen atom or a free or functionally converted hydroxyl group and a lower aliphatic hydrocarbon radical, and which may contain in addition one or more double bonds, free or functionally converted hydroxyl and oxo groups, lower alkyl groups and halogen atoms, is allowed to react with an alkali metal in a lower aliphatic primary amine, as a result of which a Δ⁴-19-nor-androstene compound is formed which is not oxygenated in 3-position, after which, if desired, the double bond(s) present is (are) reduced and/or one or more of the free and functionally converted secondary hydroxyl groups present are oxidized or hydrolyzed and oxidized to an oxo group.

The etherified hydroxyl group present in the starting substances in 3-position may be an alkoxy, aryloxy, or aralkoxy group, e.g. a methoxy, ethoxy, isopropoxy, pentoxy, phenyloxy, benzoxy, or triphenyl methoxy group. By a lower aliphatic hydrocarbon radical, which may be present in 17-position, is understood a radical with 1–6 C-atoms which may be substituted by one or more free or functionary converted hydroxyl and oxo groups.

In addition to the said substituents in the positions 3 and 17 the starting substances may moreover contain one or more lower alkyl groups and free or functionally converted hydroxyl or oxo groups in other positions, e.g. in the positions 1, 2, 4, 6, 7, 8, 9, 11, 12, 14, 15, and 16.

By a functionally converted hydroxyl group is understood an etherified or esterified hydroxyl group. The esterified hydroxyl group may be derived from an aliphatic, aromatic or araliphatic carboxylic acid. By a functionally converted oxo group is understood, e.g. an enolester, enolether, acetal, enamine, semicarbazone, mercaptal or hydrazone group.

The starting substances may in addition be substituted by one or more halogen atoms, e.g. in the positions 2, 4, 6, 7, 8, 9, 11, 12, 14, 15, and 16, and may moreover contain one or more double bonds, e.g. in the positions 11 and 14.

As starting substances for the present process may serve, e.g. the 3-ethers of oestrone, oestriol, oestradiol, 1-alkyl-oestrone, 1-alkyl-oestradiol and the 3-ethers of the oestradiols or esters thereof substituted by an alkyl group in 17-position, which compounds may in addition be substituted in the way as described above.

As examples of starting substances are mentioned the 3-ethers of: 17α-methyl oestradiol; 17α-ethyl oestradiol; 17α-methyl oestradiol-17-propionate; 17β-butyl oestradiol-17-phenylpropionate; 17β-ethyl oestradiol-17-phenylpropionate, 17α - capryloestradiol-17-capronate; 17α - ethyl oestradiol-17-isocapronate; 17α-methyl oestradiol-17-cyclohexylbutyrate; 1-methyl oestradiol; 1-methyl oestradiol-17 - acetate; 1 - methyl oestradiol-17-phenylpropionate; oestriol; oestriol-16,17-diacetate; oestriol-16-propionate-17-acetate; Δ¹,³,⁵(¹⁰)-3-hydroxy-20-oxo-pregnatriene and Δ¹,³,⁵(¹⁰)-3,20-dihydroxy-pregnatriene.

Before being subjected to the action of the reagent the starting substances are dissolved in a suitable organic solvent, such as a lower aliphatic ether, e.g. dimethyl ether, methyl ethyl ether, diethyl ether, and dioxane, or tetrahydrofurane. To this solution is added a solution of an alkali metal in a primary amine, as a result of which the desired reaction may occur. The reaction according to the present process is preferably carried out at the boiling point of the used amine, but occurs also already at lower temperature.

In principle any alkali metal, such as Li, Na or K may be applied in this reaction, but it has appeared of advantage to use lithium. As examples of a lower aliphatic primary amine are mentioned methylamine, ethylamine, n-propylamine, and isopropylamine. Preferably ethylamine is applied.

From the resulting reaction mixture the Δ⁴-19-nor-androstene compounds which are not oxygenated in 3-position, can be obtained, e.g. by means of crystallization or chromatography, e.g. over aluminum oxide.

Preferably the Δ⁴-19-nor-androstene compounds are separated by distributing the resulting crude reaction mixture between a mixture of aqueous methanol and petroleum-ether, followed by separation of the petroleum-ether layer and isolation of the Δ⁴-19-nor-androstene compounds from the solvent. The mixture of methanol, petroleum-ether, and water used in this distribution is preferably applied in a volume ratio of 7:10:3.

It is possible to subject the crude reaction mixture—before isolating the desired compound—to an acid hydrolysis, as a result of which the 3-enolethers, formed in this reaction as by-products, of the starting substances partly reduced in ring A, are converted into saturated or unsaturated ketones, which can be removed by means of a ketone reagent, such as Girard reagent T or P, a semicarbazide, hydrazine or a derivative thereof. Also fractional crystallization or chromatography may be applied for this purpose.

The new Δ⁴-19-nor-androstene compounds are white crystalline solids. Their molecular structure follows from the data obtained in the elementary analyses, oxidation and reduction reactions, and from infrared spectra. For example, the Δ⁴-17β-hydroxy-19-nor-androstene which is obtained from 17β-oestradiol-3-methylether affords, on oxidation with a large excess of chromic acid or t. butylchromate, the known Δ⁴-3,17-dioxo-19-nor-androstene, identified by mixed melting point determination and comparison of the IR-spectra of this compound and the Δ⁴-3,17-dioxo-19-nor-androstene prepared according to a known method.

The infrared spectrum of the said Δ⁴-17β-hydroxy-19-nor-androstene shows charatceristic bands at about 2.81μ, 2.90μ, 6.02μ, 12.4μ and 14.8μ. The two bands at short wave length are characteristic for a hydroxyl group. The other bands are highly characteristic for a double bond between the carbon atoms 4 and 5 and occur in the IR-spectra of all unsaturated compounds obtained according to the invention, provided bands due to other functional groups do not interfere therewith. On catalytic hydrogenation one mol. of hydrogen is consumed giving a saturated dihydro derivative. In the IR spectrum of this derivative the bands at 6.02μ, 12.4μ, and 14.8μ have disappeared.

The double bond between the C atoms 4 and 5 and other double bonds, if any, present in the compounds, obtained by conversion of the starting product with an alkali metal in a lower aliphatic primary amine, may be reduced e.g. by means of hydrogen in the presence of a catalyst.

Of the resulting unsaturated or saturated 19-nor steroids one or more of the secondary free or functionally converted hydroxyl groups present may be converted, if desired, by oxidation, or hydrolysis followed by oxidation into an oxo group. In this manner, starting from an unsaturated or saturated 17-hydroxy steroid, the corresponding 17-oxo compound can be prepared by oxidation e.g. according to the Oppenauer method or with chromium trioxide.

If desired, the resulting saturated and unsaturated 19-nor steroids can be esterified with an aliphatic, aromatic or araliphatic carboxylic acid, e.g. acetic acid, propionic acid, butyric acid, valeric acid, capronic acid, isocapronic acid, succinic acid, tartaric acid, cyclopentyl acetic acid, β-cyclopentylpropionic acid, cyclohexyl acetic acid, γ-cyclohexylbutyric acid, phthalic acid, phenyl acetic acid, β-phenyl propionic acid, benzoic acid.

The final products of the present process are biologically active or are useful as intermediates in the preparation of biologically active compounds.

Some of these compounds have a progestative and/or anabolic activity. In some cases also an inhibitory effect was observed of the production of the gonadotropic hormone.

The new compounds according to the invention can be brought in any form suitable for administration, e.g. in emulsion form or, by dissolving in a solvent suitable for injection, to an injection preparation. The oral mode of administration being the most simple, it is recommendable to bring the present compound in a form suitable for this administration, e.g. tablets, pills or coated tablets. For this purpose use is made of filling substances, such as lactose, a disintegrating agent, such as starch, a lubricant such e.g. as talc and magnesium stearate, and, if necessary, also taste corrigents and dyes. Any thus obtained mass can be excellently pressed to tablets.

The following examples illustrate the invention.

*Example I*

To 145 ml. of dry ethylamine, which is cooled in ice, 1.5 g. of lithium cut to small pieces are added. After 10 to 20 minutes blue coloration occurs. Then a solution of 3.0 g. of 17α-methyl-oestradiol-3-methyl-ether in absolute ether is added at such a rate that the solution is not discoloured. Subsequently the reaction mixture is stirred at a temperature of 0–5° C. for 20 hours, after which 50 ml. of absolute ethanol are added. Then the ethylamine is distilled off at low pressure. To the remaining solution 50 ml. of ether and 50 ml. of water are added. The water layer is separated and extracted a few times with ether. The collected ether extracts are added to the ethereal layer, after which this ethereal solution is washed with a 2 N hydrochloric acid solution, subsequently with a saturated sodium bicarbonate solution, and then with water. The ethereal solution is then dried on sodium sulphate and finally evaporated to dryness.

The resulting crude reaction product is dissolved in a mixture of benzene and petroleum-ether (1:5) and chromatographed over a column prepared with 70 g. of aluminum oxide. From the benzene-petroleum-ether eluates 1.85 g. of the $\Delta^4$-17α-methyl-17β-hydroxy-19-nor-androstene melting at 142°–148° C. are obtained. After recrystallization from acetone it has a melting point of 147–151° C.

The infrared spectrum of this compound in $CS_2$ solution shows characteristic bands at 2.82μ, 2.90μ (hydroxyl group) and 6.02μ, 12.3μ and 14.8μ (double bond). The empirical formula is $C_{19}H_{30}O$ (Calculated: C, 83.15%; H, 11.02%. Found: C, 82.96%; H, 10.87%).

*Example II*

0.6 g. of the compound prepared in Example I is dissolved in 50 ml. of glacial acetic acid and after the addition of 50 mg. of a Pt-catalyst shaken in a hydrogen atmosphere. After 45 minutes the reaction mixture does not take up any more hydrogen. The catalyst is then filtered off and the filtrate is evaporated to dryness.

From the residue is obtained by crystallization from acetone-ether the 17α-methyl-17β-hydroxy-19-nor-androstane, melting at 157–160° C. According to the results of the elementary analysis the compound has the empirical formula $C_{19}H_{32}O$ (Calculated: C, 82.54%; H, 11.66%. Found: C, 82.29%; H, 11.76%). The infrared spectrum shows bands at 2.82 and 2.92μ (OH group) and no characteristic absorption above 11μ.

*Example III*

To 140 ml. of dry methylamine, which is cooled in a mixture of ice and salt, 4.7 g. of sodium cut to small pieces are added. After some time blue coloration occurs. Then a solution of 3.0 g. of 17α-methyl-oestradiol-3-methylether in absolute ether is added at such a rate that the solution is not discoloured. Subsequently the reaction mixture is stirred at −10° C. for 35 hours, after which, in an analogous manner as described in Example I, the crude reaction product is obtained. This is dissolved in 100 ml. of methanol. After having added 4.5 ml. of concentrated hydrochloric acid, the mixture is heated to 60° C. and stirred at this temperature for 15 minutes. The solution is then cooled to room temperature and subsequently diluted with 1 l. of water and extracted with chloroform.

The chloroform solution is washed with water and evaporated to dryness. The residue is dissolved in a mixture of 30 ml. of absolute ethanol and 3 ml. of dry glacial acetic acid. To this solution 2 g. of Girard-reagent P are added, after which the mixture is boiled under reflux for 30 minutes. After the reaction mixture has been cooled to room temperature it is poured into 375 ml. of icy water and adjusted to a pH of 6.0–6.5 with sodium carbonate. The solution is extracted with chloroform. The chloroform extracts are washed with water and evaporated to dryness. On crystallization of the residue from acetone-ether 1.75 g. of the compound described in Example I are obtained.

*Example IV*

4.5 g. of lithium cut to small pieces are added to 435 ml. of dry ethylamine which is cooled in ice. After the solution turns blue 9 g. of 17α-ethyloestradiol-3-ethylether dissolved in 900 ml. of dry ether are added. The reaction mixture is then treated as described in Example I. The crude product is distributed between equal parts of petroleum ether and 70% methanol. From the petroleum ether layer 5.6 g. of $\Delta^4$-17α-ethyl-17β-hydroxy-19-nor-androstene with a melting point of about 50° C. are obtained. The IR-spectrum shows bands at 2.81μ, 2.90μ (OH-group) and 6.02μ, 12.35μ and 14.88μ ($\Delta^4$ double bond).

*Example V*

2.2 g. of $\Delta^4$-17α-ethyl-17β-hydroxy-19-nor-androstene, dissolved in 75 ml. of glacial acetic acid, are reduced as described in Example II. The 17α-ethyl-17β-hydroxy-19-nor-androstane shows no characteristic absorption in IR-light above 11μ.

*Example VI*

To 145 ml. of dry methylamine which is cooled to −20° C. 1.5 g. of lithium cut to small pieces are added. To the solution which is blue in colour after 10–20 minutes, a solution of 3.0 g. of oestradiol-3-methyl-ether in 145 ml. of absolute ether is added dropwise. Subsequently the reaction mixture is stirred at −10° C. for 40 hours, after which 50 ml. of absolute ethanol are added. Then the methylamine is distilled off at low pressure and the remaining solution is further treated in a corresponding manner as described in Example I. The Δ⁴-17β-hydroxy-19-nor-androstene ($C_{18}H_{28}O$) obtained after chromatographic purification has a melting point of 80–90° C. and 95–100° C. after repeated crystallisation from petroleum ether. Yield 62%. The IR-spectrum shows bands at 2.89μ and 2.92μ (OH-group) and 6.02μ, 12.4μ and 14.85μ (Δ⁴-double bond).

The benzoate of the Δ⁴-17β-hydroxy-19-nor-androstene was prepared by the action of benzoylchloride in pyridine solution. The melting point is 133–134° C. The IR-spectrum shows bands at 5.8μ, 14.1μ, 14.6μ (benzoxy group) and 12.4μ and 14.82μ (Δ⁴ double bond). In this spectrum the 6.02μ band could not be detected, due to the strong absorption of the benzoxy group at 5.8μ.

The acetate of the Δ⁴-17β-hydroxy-19-nor-androstene was prepared with acetic acid anhydride in pyridine. The melting-point is 67–71° C. The IR-spectrum shows bands at 5.78μ and 8.05μ (acetoxy group) and 6.00μ, 12.38μ and 14.83μ (Δ⁴ double bond).

By catalytic hydrogenation of these compounds the corresponding dihydro derivatives are obtained. The 17β-hydroxy-19-nor-androstane has a melting point of 110–113° C. The benzoate has a melting point of 120–121° C. The IR-spectrum shows bands at 5.83μ, 14.1μ, 14.58μ (benzoxy group). No absorption, due to isolated double bonds, is observed.

Starting from the 3-glycolether of oestradiol the same compounds are obtained.

Example VII 1 g. of Δ⁴-17β-hydroxy-19-nor-androstene obtained according to Example VI ($C_{18}H_{28}O$) is dissolved in 20 ml. of glacial acetic acid. At room temperature a solution of 760 mg. of chromiumtrioxyde in 1.9 ml. of water and 7.5 ml. of glacial acetic acid is added. The reaction mixture is left to stand at room temperature. Then it is diluted with 360 ml. of water and extracted with chloroform. The chloroform extracts are washed successively with a dilute sulphuric acid solution, a sodium carbonate solution and water, and then dried on sodium sulphate.

The solution is subsequently evaporated to dryness. From the residue the Δ⁴-17-oxo-19-nor-androstene of melting point 113–115° C. is obtained by crystallisation from acetone petroleum ether. The IR-spectrum shows bands at 5.75μ (CO-group) and 6.00μ, 12.38μ and 14.8μ (Δ⁴ double bond).

Catalytic hydrogenation of this compound whereby the reaction is interrupted after consumption of 1 mol of hydrogen, yields the 17-oxo-19-nor-androstane, with a melting point of 120–122° C. The IR-spectrum shows a band at 5.76μ (CO-group) and no characteristic absorption above 11μ.

Example VIII

In an analogous manner as described in Example I oestradiol is converted into the Δ⁴-16α,17β-dihydroxy-19-nor-androstene. Yield 64%. Catalytic hydrogenation of this compound yields the 16α,17β-dihydroxy-19-nor-androstane.

Example IX

According to the process of Example I and starting from 1 g. of Δ¹,³,⁵⁽¹⁰⁾-1-methyl-17-hydroxy-oestratriene the Δ⁴-1-methyl-17-hydroxy-19-nor-androstene is obtained, which shows in the IR-spectrum the characteristic band of the Δ⁴-double bond.

Oxidation of this compound in the manner as described in Example VII yields the 1-methyl-17-oxo-19-nor-androstene.

Example X

In an analogous manner as described in Example II 1 g. of the 1-methyl-17-hydroxy-19-nor-androstene prepared in Example IX is reduced to the 1-methyl-17-hydroxy-19-nor-androstane. Oxidation of this compound in the manner as described in Example VII yields the 1-methyl-17-oxo-19-nor-androstane.

We claim:
Compounds of the formula:

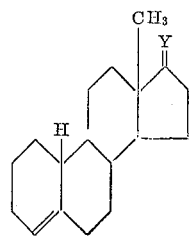

in which:
Y is selected from the group consisting of O, H($\beta OR_3$), and $R_4$ ($\beta OR_3$), in which
$R_3$ is selected from the group consisting of hydrogen and an acyl group derived from a carboxylic acid containing from 1 to 10 carbon atoms, and
$R_4$ is a saturated lower aliphatic hydrocarbon radical having from 1 to 6 carbon atoms.

References Cited in the file of this patent

Hartman: "Jour. Amer. Chem. Soc." (1955), vol. 77, pages 5151–3 relied on.

"Journal of the American Chemical Society," by Huang-Minlon, vol. 71, page 3302 relied on.

"Journal of the American Chemical Society," by Rosenkranz et al., vol. 71, page 3693 relied on.